Figures 1, 2, 3, 4:
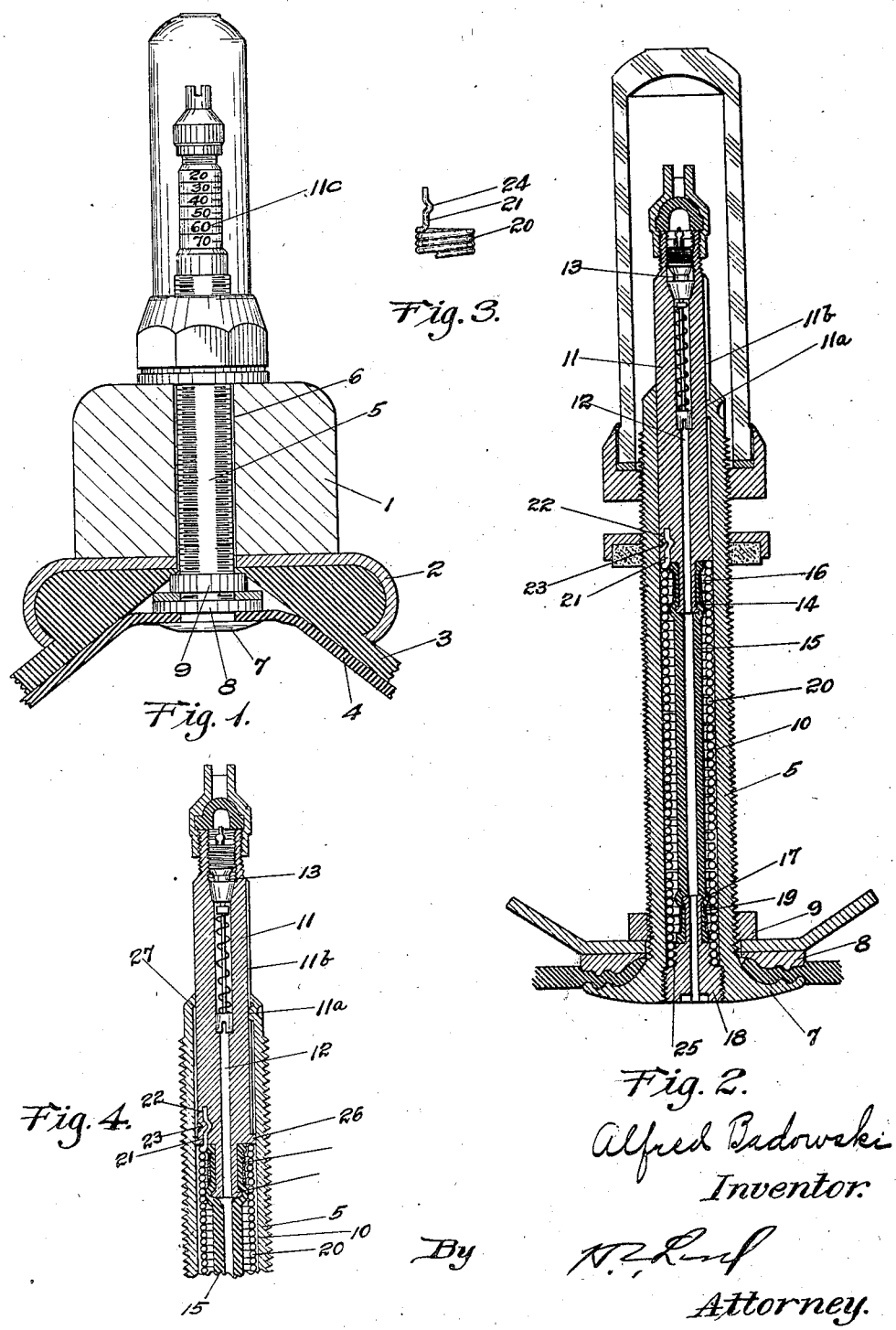

Oct. 23, 1923.

A. BADOWSKI 1,471,322

PRESSURE GAUGE FOR TIRES

Filed July 15, 1921

Alfred Badowski
Inventor.

By
Attorney.

Patented Oct. 23, 1923.

1,471,322

UNITED STATES PATENT OFFICE.

ALFRED BADOWSKI, OF CHARLESTON, WEST VIRGINIA, ASSIGNOR, BY MESNE ASSIGNMENTS, TO TIREGAGE VALVE CORPORATION, OF CHARLESTON, WEST VIRGINIA, A CORPORATION OF WEST VIRGINIA.

PRESSURE GAUGE FOR TIRES.

Application filed July 15, 1921. Serial No. 484,856.

*To all whom it may concern:*

Be it known that I, ALFRED BADOWSKI, a citizen of the United States, residing at Charleston, in the county of Kanawha and State of West Virginia, have invented new and useful Improvements in Pressure Gauges for Tires, of which the following is a specification.

Pressure gauges for pneumatic tires comprise a stem which is necessarily of a reduced diameter due to the fact that it must extend through an opening in the felloe. The pressure gauge of the present invention involves a hollow stem which is connected with the tire tube and in which is arranged a valve-carrying plunger, this plunger being subjected to the tube pressure indicating by its position the tube pressure. Devices of this kind have heretofore been made. The present invention is directed primarily to the manner of securing the spring resisting the movement of the plunger to the plunger. This is of importance due to the confined space in which the plunger and spring must be arranged, a larger spring being better adapted for the purpose.

The invention is illustrated in the accompanying drawings as follows:—

Fig. 1 shows a section of a wheel rim with the pressure gauge in place.

Fig. 2 a central section through the gauge.

Fig. 3 an enlarged view of the end of the spring.

Fig. 4 an alternative construction.

1 marks the wheel felloe, 2 the wheel rim, 3 the tire, and 4 the inner tube.

A stem 5 extends through an opening 6 in the felloe. It is provided with a head 7 between which and a washer 8 the tube is clamped by means of a nut 9 on the stem 5. The stem has a central opening 10 in which is arranged the sliding plunger 11. The plunger has an opening 12 extending through it and an inflation valve 13 is arranged in this opening. The plunger in this instance forms a sliding fit with the walls of the opening 10 and a key 11$^a$ operates in a groove 11$^b$ in the plunger. The plunger is provided with a scale 11$^c$ indicating the pressure to which the parts are subjected.

The plunger has a projection 14 on which a rubber tube 15 is secured by means of a binding wire or thread 16. The inner end of the tube extends over a projection 17 on an anchor plug 18, this plug being perforated so as to extend the opening from the elastic tube to within the tire tube. The elastic tube is bound on the projection by a wire or thread 19.

A coil spring 20 is arranged around the elastic tube. The end 21 of the spring is extended axially and projects into an opening 22 in the end of the plunger. The spring is preferably secured in this opening by offsetting the walls of the plunger adjacent to the opening at 23. This may be done by a prick punch or die which when the wire is in place indents the walls and forms an offset to the opening. The securing of the spring may be made more certain by providing a deflection 24 in the spring as shown in Fig. 3, the drawing here being somewhat exaggerated over actual practice. The offsetting of the wall is then effected at the point of this deflection. The inner end of the spring is screwed on to the anchor plug 18 at 25.

In the alternative construction the parts are similar except that the plunger has a shoulder 26 which is adapted to engage a shoulder 27 at the upper end of the stem thus preventing an accidental discharge of the plunger. It will be understood, however, that the spring has a range greater than the ordinary inflation pressure of the tire.

What I claim as new is:—

1. In a pressure gauge for pneumatic tires, the combination with a stem; a valve-carrying plunger in the stem subjected to tube pressure and movable in response to said pressure; an elastic tube maintaining communication between the plunger and the inner end of the stem, of a coil spring within the stem resisting the movement of the plunger, said spring having an axially extending end; and means for securing said end to the plunger.

2. In a pressure gauge for pneumatic tires, the combination with a stem; of a valve-carrying plunger in the stem subjected to pressure and movable in response to said pressure, said plunger having an axial opening extending inwardly from its end; a coil spring within the stem resisting the movement of the plunger, said spring having an axially extending end projecting into the opening in the plunger; and means for securing said end in the opening.

3. In a pressure gauge for pneumatic tires, the combination with a stem; of a valve-carrying plunger in the stem subjected to pressure and movable in response to said pressure, said plunger having an axial opening extending inwardly from its end; a coil spring within the stem resisting the movement of the plunger, said spring having an axially extending end projecting into the opening in the plunger; and means for securing said end in the opening comprising an offset in the wall of the opening.

4. In a pressure gauge for pneumatic tires, the combination with a stem; of a valve-carrying plunger in the stem subjected to tube pressure and movable in response to said pressure, said plunger having an axial opening extending inwardly from its end; a coil spring within the stem resisting the movement of the plunger, said spring having an axially extending end, said extending end having a deflection and projecting into the opening; and means for securing said end in said opening comprising an off-set in the walls of the opening registering with the deflection in the end.

In testimony whereof I have hereunto set my hand.

ALFRED BADOWSKI.